US008816966B2

(12) United States Patent
Yoshida et al.

(10) Patent No.: US 8,816,966 B2
(45) Date of Patent: Aug. 26, 2014

(54) TOUCHSCREEN JAPANESE CHARACTER SELECTION THROUGH SLIDING INPUT

(75) Inventors: Taketoshi Yoshida, Tokyo (JP); Yasuhiko Mori, Tokyo (JP); Takeshi Tanaka, Tokyo (JP); Shinji Morimitsu, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 13/238,672

(22) Filed: Sep. 21, 2011

(65) Prior Publication Data

US 2012/0299835 A1 Nov. 29, 2012

Related U.S. Application Data

(60) Provisional application No. 61/488,918, filed on May 23, 2011.

(51) Int. Cl.
*G06F 3/02* (2006.01)
(52) U.S. Cl.
USPC .......................................... 345/171; 345/173
(58) Field of Classification Search
CPC .......... G06F 3/0488; G06F 3/018; G06F 3/02
USPC ........................................................ 345/171
See application file for complete search history.

(56) References Cited

U.S. PATENT DOCUMENTS

| 2007/0174788 | A1* | 7/2007 | Ording | 715/816 |
|---|---|---|---|---|
| 2009/0058823 | A1* | 3/2009 | Kocienda | 345/173 |
| 2009/0140991 | A1* | 6/2009 | Takasaki et al. | 345/173 |
| 2009/0265669 | A1* | 10/2009 | Kida et al. | 715/863 |
| 2010/0241993 | A1* | 9/2010 | Chae | 715/830 |
| 2010/0333011 | A1 | 12/2010 | Kornev et al. | |
| 2011/0057903 | A1 | 3/2011 | Yamano et al. | |

OTHER PUBLICATIONS

Sheppard, Andrew, "How I Use My Mobile Device: Kotoba", Retrieved on: Jul. 6, 2011, 2 pages Available at: http://palmaddict.typepad.com/palmaddicts/2009/12/how-i-use-my-mobile-device-kotoba.html.
"Slide Keyboard", Retrieved Date: Jul. 6, 2011, 13 pages Available at: http://www.asigbe.com/slidekeyboard.html.
Carlson, Jeff, "22 Useful iPad Tips", Published on: Apr. 6, 2010, 15 pages Available at: http://tidbits.com/article/11167.
Ng, Simon, "iPhone Tips 13 Keyboard Shortcut & Navigation Tricks", Published on: Aug. 11, 2008, 11 pages Available at: http://www.simonblog.com/2008/08/11/iphone-tips-keyboard-shortcut-navigation-tricks/.

(Continued)

*Primary Examiner* — Lixi C Simpson
(74) *Attorney, Agent, or Firm* — Tony Azure; Sergey Lamansky; Micky Minhas (57) ABSTRACT

Systems, methods, and computer media for selecting characters through touchscreen input are provided. A user selection of a first character, such as a Japanese kana character, displayed on a touchscreen is received. A plurality of additional characters syllabically related to the first character are identified. A presentation order of the plurality of additional characters is identified. In response to receiving the user selection of the first character, at least a first and a second additional character from the plurality of syllabically related additional characters are displayed. The first additional character is displayed adjacent to the first character, and the second additional character is displayed adjacent to the first additional character. The displayed first and second additional characters are selectable by a user touch input.

18 Claims, 9 Drawing Sheets

(56) References Cited

OTHER PUBLICATIONS

Kschang, "Free Android Soft Keyboard Alternative: Comparing 38 Different Input Methods from ABC Keyboard to ZetaType", Retrieved on: Jul. 6, 2011, 12 pages Available at: http://hubpages.com/hub/Android-Softkeyboard-Shootout-which-input-method-should-you-use.

Bove, Tony, "Touch-Screen Tips for the Apple iPod touch", Retrieved Date: Jul. 6, 2011, 2 pages Available at: http://www.dummies.com/how-to/content/touchscreen-tips-for-the-apple-ipod-touch.html.

* cited by examiner

FIG. 1

|   | -   | k   | s   | t   | n   | h   | m   | y   | r   | w   |
|---|-----|-----|-----|-----|-----|-----|-----|-----|-----|-----|
| a | あア | かカ | さサ | たタ | なナ | はハ | まマ | やヤ | らラ | わワ |
| i | いイ | きキ | しシ | ちチ | にニ | ひヒ | みミ | *   | りリ | ゐヰ |
| u | うウ | くク | すス | つツ | ぬヌ | ふフ | むム | ゆユ | るル | *   |
| e | えエ | けケ | せセ | てテ | ねネ | へヘ | めメ | *   | れレ | ゑヱ |
| o | おオ | こコ | そソ | とト | のノ | ほホ | もモ | よヨ | ろロ | をヲ |
| - | *   | *   | *   | *   | んン | *   | *   | *   | *   | *   |

FIG. 2A
PRIOR ART

|   | g   | z   | d   | b   | p   |
|---|-----|-----|-----|-----|-----|
| a | がガ | ざザ | だダ | ばバ | ぱパ |
| i | ぎギ | じジ | ぢヂ | びビ | ぴピ |
| u | ぐグ | ずズ | づヅ | ぶブ | ぷプ |
| e | げゲ | ぜゼ | でデ | べベ | ぺペ |
| o | ごゴ | ぞゾ | どド | ぼボ | ぽポ |

FIG. 2B
PRIOR ART

|    | k   | s   | t   | n   | h   | m   | r   |
|----|-----|-----|-----|-----|-----|-----|-----|
| ya | きゃ | しゃ | ちゃ | にゃ | ひゃ | みゃ | りゃ |
| yu | きゅ | しゅ | ちゅ | にゅ | ひゅ | みゅ | りゅ |
| yo | きょ | しょ | ちょ | にょ | ひょ | みょ | りょ |

TOUCHSCREEN JAPANESE CHARACTER SELECTION THROUGH SLIDING INPUT

CROSS-REFERENCE TO RELATED APPLICATIONS

This application claims priority to U.S. provisional application 61/488,918, filed May 23, 2011 and titled "Touchscreen Japanese Character Selection Through Sliding Input," the disclosure of which is hereby incorporated herein in its entirety by reference.

BACKGROUND

Touchscreens have been increasingly incorporated into mobile devices such as smart phones, tablets, and laptops in recent years. Touchscreen devices that serve as phones typically implement a standard 12-key phone keypad using soft keys demarcated on the touchscreen for each of the 12 keys. The standard 12-key phone keypad is used both for entering numbers and for selecting letters for text entry. For example, on an English 12-key keypad, the center button on the top row is for the number "2" and the letters "a," "b," and "c."

Challenges have arisen in implementing a standard 12-key phone keypad on a touchscreen for text entry in character-based languages such as Japanese and Chinese. Character-based scripts in which each character represents a word are especially difficult to usefully implement because of the large number of characters. Character-based scripts in which each character represents a syllable (syllabic character) of a word are typically favored for text entry. In Japanese, the use of syllabic kana characters is therefore more common than use of kanji characters for text entry from a 12-key phone keypad.

Kana characters, however, present their own difficulties. There are still a larger number of kana characters than Roman letters (e.g., a, b, c), and some syllables are formed by combining a kana character with a modifier. Previous attempts at implementing a 12-key kana character keypad on a touchscreen assigned five kana characters to one soft key, with a first character displayed on the soft key and the other four characters selectable by sliding up, down, left, and right, respectively, for each of the other four characters. Such an arrangement of characters is not intuitive to mobile device users, causing users to experience a frustrating period of time during which the user slowly learns the location of each character. Additionally, in previous attempts, the user had to manually select a kana character modifier.

SUMMARY

Embodiments of the present invention relate to systems, methods, and computer media for selecting characters through touchscreen input. Using the systems and methods described herein, a user selection of a first character displayed on a touchscreen is received. A plurality of additional characters syllabically related to the first character is identified. A presentation order of the plurality of additional characters is identified. In response to receiving the user selection of the first character, at least a first and a second additional character from the plurality of syllabically related additional characters is displayed, the first additional character displayed adjacent to the first character and the second additional character displayed adjacent to the first additional character, the displayed first and second additional characters selectable by a user touch input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention relate to systems, methods, and computer media for selecting characters through touchscreen input. In accordance with embodiments of the present invention, a 12-key soft key phone keypad on a touchscreen is used to receive user selections of characters. Syllabic characters, such as Japanese kana characters, can be easily and intuitively selected with no learning curve. Additionally, character modifiers can be quickly and easily selected.

As discussed above, character-based scripts such as kanji in which each character represents a word are difficult to implement on a 12-key keypad because of the sheer number of characters. Syllabic character-based scripts, such as kana, are more easily adapted to 12-key keypad input. Previous attempts at kana character selection using a 12-key touchscreen keypad input were not intuitive, however, and users suffered through a frustrating learning curve as they figured out where the various characters were located.

Figure 2A:
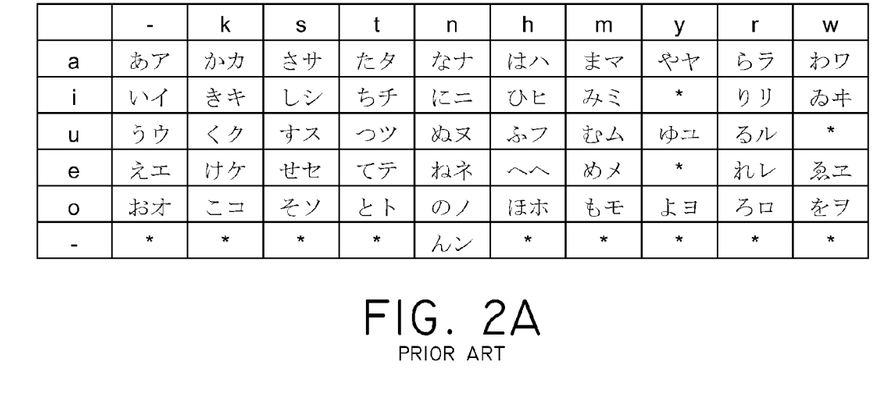
FIG. 2A is a prior art table of Japanese Kana characters.
Figure 2B:
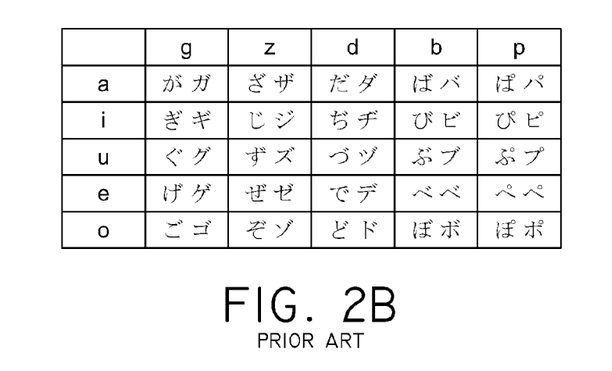
FIG. 2B is a prior art table of Japanese Kana characters and modifiers.
Figure 2C:
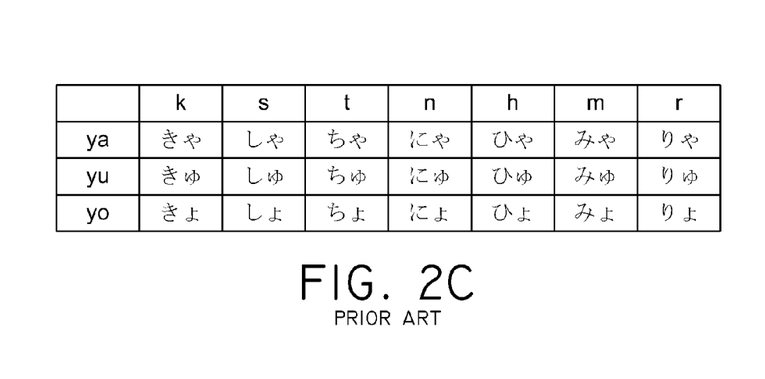
FIG. 2C is a prior art table of Japanese Kana characters and modifiers.

Kana is a general name for several syllabic (syllable-based) Japanese scripts, including hiragana, katakana, and manyogana. The examples in the figures of this application are hiragana. FIGS. 2A-2C illustrate the various kana characters. The roman letters along the top and left can be combined to make a syllable and find the corresponding kana character. In FIGS. 2A-2C, hiragana characters are on the left, and katakana characters are on the right. The examples in FIGS. 4A-4H, 5A-5C, 6A-6E, and 7 are hiragana.

To make certain syllables, kana characters from FIG. 2A are combined with a kana character modifier (modifier). This is illustrated in FIGS. 2B and 2C. The modifiers shown in FIG. 2B are sometimes known as dakuten and handakuten diacritic marks. The dakuten mark is also known as "dull," and the handakuten mark is also known as "half-dull." FIG. 2C illustrates pairs of characters in which a "small" modifier, which is a character itself, corresponding to "ya," "yu," or "yo" is paired with a kana character from FIG. 2A. As used in this application, "kana character modifier" is a mark or character that modifies the kana characters in FIG. 2A. Thus, kana character modifiers include the dakuten mark (resembling a quotation mark), the handakuten mark (resembling a small circle), and the three "small" modifiers that are the second characters in each of the boxes in FIG. 2C.

Embodiments of the present invention provide intuitive methods for selecting kana characters based on the accepted kana character teaching order in which Japanese students learn kana characters. FIGS. 2A-2C are formatted in this order. By aligning the display order of kana characters for user selection with the accepted and generally understood order of characters, a user immediately knows where each character can be found using the 12-key touchscreen keypad. For example, a sliding user selection of a first kana character, the selection sliding to the right, may cause the next kana character in the accepted teaching order to be displayed as the selection reaches a first threshold point. As the user selection continues still further to the right and reaches the next threshold point, the next kana character is displayed, etc. This is illustrated in detail in the figures and discussed in detail below.

Additionally, intuitive user selection of kana character modifiers and characters with modifiers can be provided using the accepted teaching order shown in FIGS. 2B-2C. This eliminates the need to manually select a modifier after selecting a character.

In one embodiment of the present invention, a user selection of a first character displayed on a touchscreen is received. A plurality of additional characters syllabically related to the first character is identified. A presentation order of the plurality of additional characters is identified. In response to receiving the user selection of the first character, displaying at least a first and a second additional character from the plurality of syllabically related additional characters, the first additional character displayed adjacent to the first character and the second additional character displayed adjacent to the first additional character, the displayed first and second additional characters selectable by a user touch input.

In another embodiment, a mobile device comprises a processor, a memory, and a display engine. The display engine receives a user selection of a first kana character displayed on a soft key. The display engine identifies a plurality of additional kana characters syllabically related to the first kana character. The display engine also identifies a presentation order of the plurality of additional characters. In response to receiving the user selection of the first kana character, the display engine also displays at least a first and a second additional kana character from the plurality of syllabically related additional kana characters. The first additional kana character is displayed adjacent to the first kana character and the second additional kana character displayed adjacent to the first additional kana character. The displayed first and second additional kana characters are selectable by a user touch input.

In still another embodiment, a first sliding user selection of a first kana character displayed on a soft key is received. The first user sliding selection extends away from the displayed first kana character, beyond a plurality of threshold points, and to an end point. A plurality of additional kana characters syllabically related to the first kana character are identified. One or more kana character modifiers that are used with the first kana character and the plurality of additional kana characters are also identified. Further, a presentation order of the plurality of additional kana characters that reflects a typical kana character teaching order is identified.

Upon determining that the first user sliding selection extends in a first direction from the displayed first kana character, one of the plurality of syllabically related additional kana characters that is next in the identified presentation order is displayed as the first user sliding selection extends beyond each of the plurality of threshold points in the first direction. Upon determining that the first sliding user selection extends in a second direction from the displayed first kana character, as the first sliding user selection extends beyond a first threshold point in the second direction, both the first kana character and one of the one or more identified kana character modifiers are displayed on a new single, user-selectable soft key. As the first sliding user selection extends beyond each of the remaining plurality of threshold points in the second direction, both (1) one of the plurality of syllabically related additional kana characters that is next in the identified presentation order and (2) one of the one or more identified kana character modifiers are displayed on a new single, user-selectable soft key. The second direction is different from the first direction.

Figure 1:
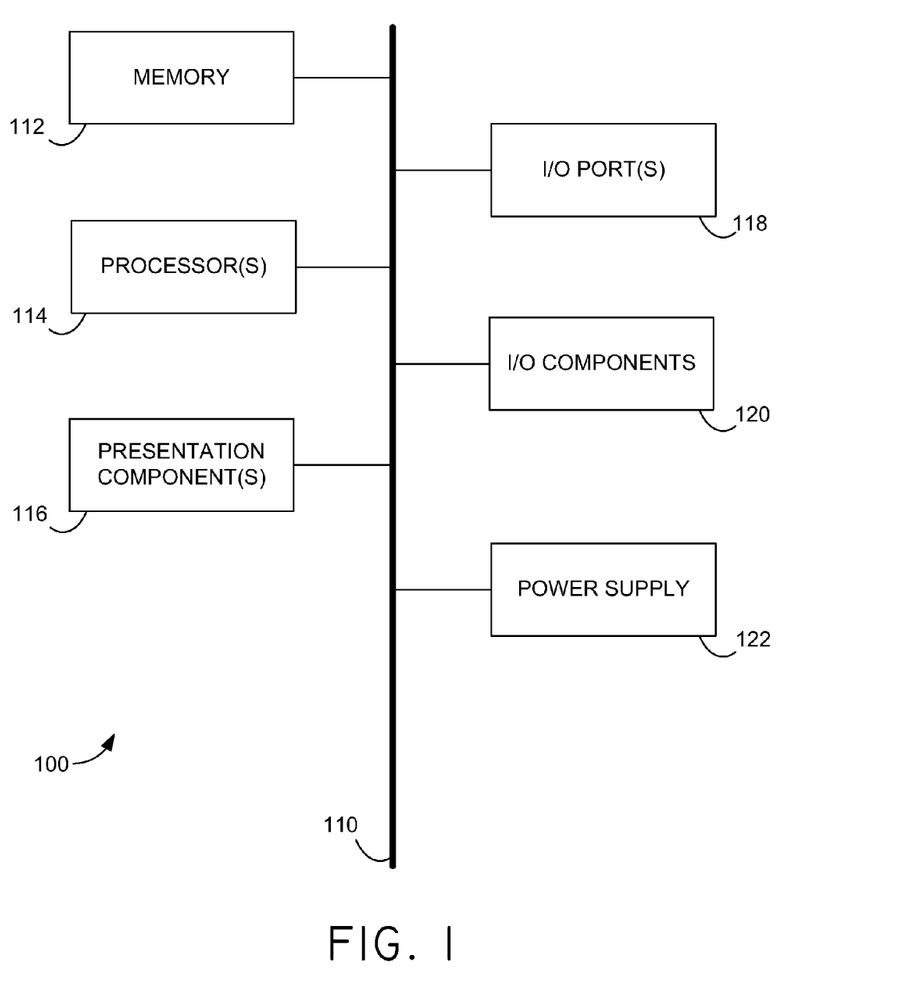
FIG. 1 is a block diagram of an exemplary computing environment suitable for use in implementing embodiments of the present invention.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, etc. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Communication media typically embodies computer-readable instructions, data structures, program modules, or other data in a modulated data signal such as a carrier wave. The term "modulated data signal" refers to a propagated signal that has one or more of its characteristics set or changed to encode information in the signal. By way of example, and not limitation, communication media includes wired media, such as a wired network or direct-wired connection, and wireless media such as acoustic, RF, infrared, radio, microwave, spread-spectrum, and other wireless media. Combinations of the above are included within the scope of computer-readable media.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As discussed previously, embodiments of the present invention relate to systems, methods, and computer media for selecting characters through touchscreen input. FIGS. 2A-2C, discussed above, illustrate a prior art table of kana characters that represent an accepted teaching order. Embodiments of the present invention will be discussed with reference to FIGS. 3-9.

Figure 3:
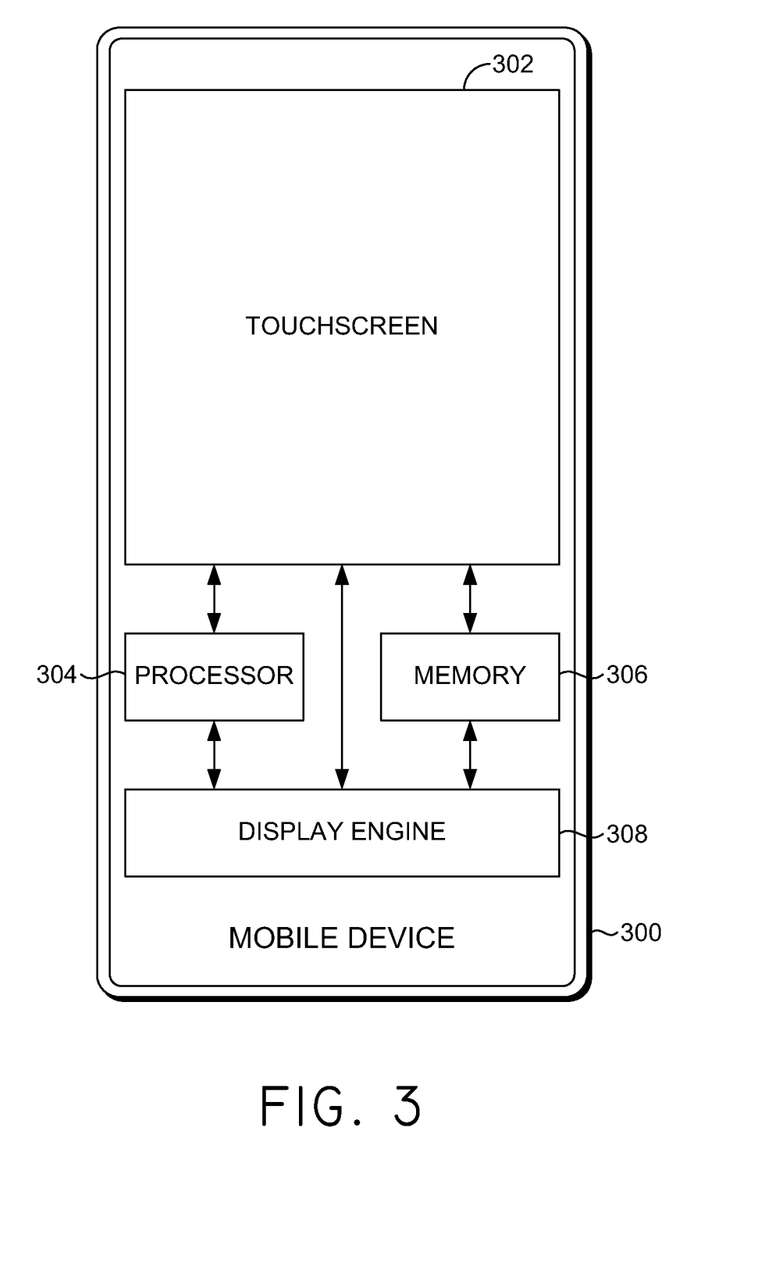
FIG. 3 is a block diagram of a mobile device in accordance with embodiments of the present invention.

FIG. 3 is a block diagram illustrating an exemplary mobile device 300. Mobile device 300 includes a touchscreen 302 that displays a user interface for selecting Japanese kana characters. In some embodiments, the user interface is a 12-key soft key keypad. Touchscreen 302 is coupled to a processor 304, memory 306, and a display engine 308. In some embodiments, computer-readable instructions that implement the functionality of display engine 308 are stored in memory 306. Display engine 308 receives a user selection of a first kana character displayed on a soft key. Display engine 308 also identifies a plurality of additional kana characters syllabically related to the first kana character. Display engine 308 further identifies a presentation order of the plurality of additional characters. In response to receiving the user selection of the first kana character, display engine 308 displays or transmits instructions to display at least a first and a second additional kana character from the plurality of syllabically related additional kana characters. The first additional kana character is displayed adjacent to the first kana character, and the second additional kana character is displayed adjacent to the first additional kana character. The displayed first and second additional kana characters are selectable by a user touch input.

As used herein, "syllabically related" refers to characters having one of the two letters in the syllable sound in common. For example, in FIG. 2A, the kana characters in the "k" column are all syllabically related. Similarly, the kana characters in the "s" column are all syllabically related. In some embodiments, the characters in each row, for example the "a" row, may also be considered to be syllabically related.

FIGS. 4A-4H illustrate an embodiment of the present invention in which a first kana character 402 is selected using a sliding user selection 404. Sliding user selection 404 extends away from first kana character 402 to the right as shown by arrow 406. Selection of first kana character 402 has caused a new user-selectable soft key 408 displaying first kana character 402 to appear above first kana character 402. As sliding user selection 404 continues to extend to the right, a first threshold point is passed (not shown), causing a first additional syllabically related kana character 410 to be overlappingly displayed adjacent to soft key 408. "Adjacent," as used in this application includes being near, touching, and overlapping. The threshold point may be a time threshold or a distance across which first sliding user selection 404 has extended.

Figure 4A:
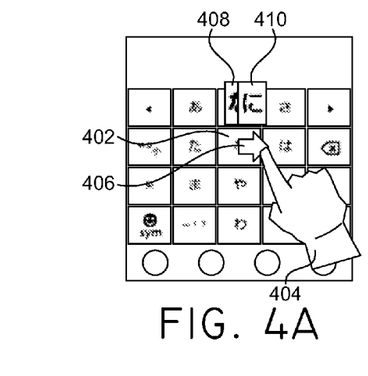
FIG. 4A illustrates an exemplary sliding user selection of a first kana character on a touchscreen 12-key keypad in which a first kana character is initially selected and displayed and one additional syllabically related kana character is also displayed as the sliding user selection extends to the right.
Figure 4B:
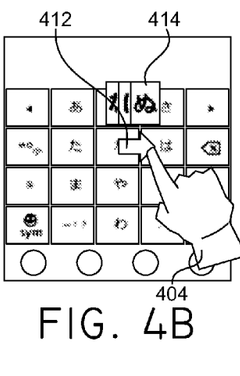
FIG. 4B illustrates the sliding user selection of FIG. 4A as the sliding selection extends to the right and causes a second additional kana character to be displayed.
Figure 4C:
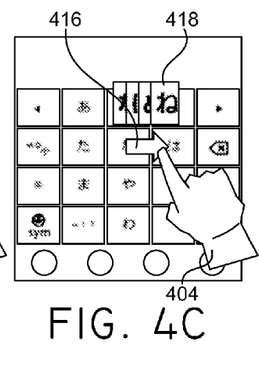
FIG. 4C illustrates the sliding user selection of FIG. 4B as the sliding selection continues to extend to the right and causes a third additional kana character to be displayed.
Figure 4D:
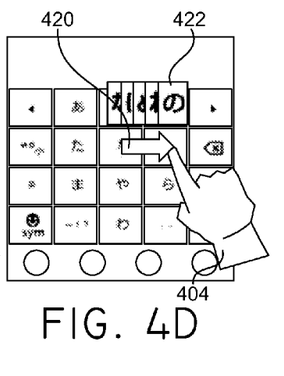
FIG. 4D illustrates the sliding user selection of FIG. 4C as the sliding selection continues to extend to the right and causes a fourth additional kana character to be displayed.

In FIG. 4B, sliding user selection 404 has continued to extend to the right as indicated by arrow 412. Sliding user selection 404 has now extended beyond a second threshold point (not shown), causing a second additional syllabically related kana character 414 to be overlappingly displayed adjacent to first additional kana character 410. Similarly, in FIGS. 4C and 4D, sliding user selection 404 has continued to extend to the right still more as indicated by arrows 416 and 420, extending beyond a third and fourth threshold point (not shown) and causing third and fourth additional kana characters 418 and 422 to be overlappingly displayed.

In the overlapping displays shown in FIGS. 4A-4D, only the last character displayed is fully visible. In some embodiments, all characters are fully visible and it is the soft keys themselves that overlap but not the characters on the soft keys. "Displayed characters" as used in this application may include empty space around the characters so that a soft key displaying a character is also considered to be a "displayed character." In other embodiments, the displayed additional syllabically related kana characters are displayed next to each other rather than overlappingly.

In some embodiments, soft key 408 is not displayed in addition to the original displayed first kana character 402. In such embodiments, the characters displayed as a result of sliding user selection 404 are additional kana characters 410, 414, 418, and 422. As mentioned, additional kana characters 410, 414, 418, and 422 are syllabically related to first kana character 402. The additional kana characters are presented according to a presentation order that reflects the typical kana character teaching order, represented in FIGS. 2A-2C. Thus, it can be seen from examination of FIG. 2A that first kana character 402 and additional kana characters 410, 414, 418, and 422 are all syllabically related because they are in the "n" column. Users already know this order for the "n" syllables and can easily extend their sliding user selection until the desired syllable is located. The desired syllable can then be selected by ending the sliding user selection when the desired character is displayed, providing a second selection of the displayed character, or through another action.

Figure 4E:
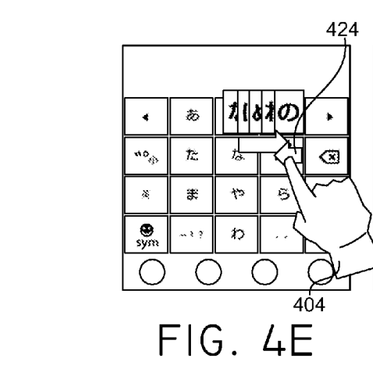
FIG. 4E illustrates the sliding user selection of FIG. 4D as the sliding selection reverses back to the left.
Figure 4F:
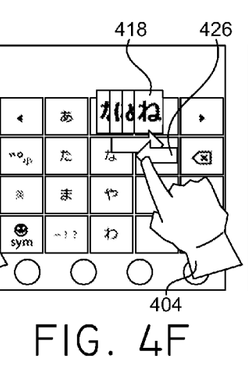
FIG. 4F illustrates the sliding user selection of FIG. 4E as the reversed sliding selection continues back to the left and causes the fourth additional kana character to no longer be displayed.
Figure 4G:
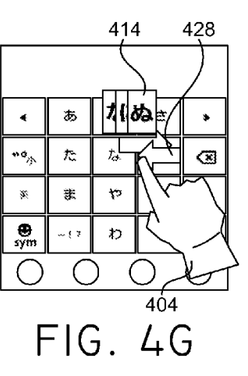
FIG. 4G illustrates the sliding user selection of FIG. 4F as the reversed sliding selection continues back to the left and causes the third additional kana character to no longer be displayed.
Figure 4H:
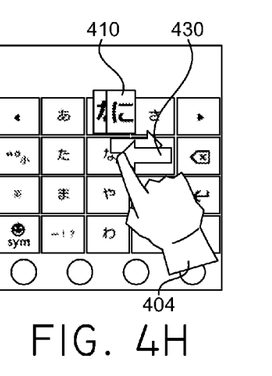
FIG. 4H illustrates the sliding user selection of FIG. 4G as the reversed sliding selection continues back to the left and causes the second additional kana character to no longer be displayed.

FIGS. 4E-4H illustrate reversing sliding user selection 404 after additional kana characters 410, 414, 418, and 422 have already been displayed as a result of extending sliding user selection 404. In FIG. 4E, arrow 424 indicates that sliding user selection 404 has been reversed to the left, in the opposite direction from the initial selection. As sliding user selection 404 continues to extend to the left as indicated by arrow 426 in FIG. 4F and passes back by the fourth threshold point, fourth additional kana character 422, which had been the last character displayed, is no longer displayed, making third additional kana character 418 the last character displayed. Similarly, in FIGS. 4G and 4H, sliding user selection 404 continues to extend in reverse back to the left as indicated by arrows 428 and 430, passing the third and second threshold points and causing third additional kana character 418 and second additional kana character 414 to no longer be displayed. In this way, as the user slides right and left with sliding user selection 404, the number of displayed additional kana characters will increase and decrease accordingly.

Reversing sliding user selection 404 can also be thought of as beginning a second sliding user selection, whether or not the user's finger is lifted. In some embodiments, the user selection is not a sliding selection. In one embodiment, a simple tap of a first kana character causes the syllabically related kana characters to be displayed adjacent to the first kana character, and a second selection of one of the additional characters selects the additional character. In other embodiments, two additional characters may be displayed per tap of the first kana character. In still other embodiments, the selection is a sliding user selection, and two, three, or four additional syllabically related kana characters are displayed at the same time when a single threshold point is passed. In one example, once sliding user selection 404 extends to the right and extends beyond a first threshold point, each of additional kana characters 410, 414, 418, and 422 are displayed fully visible and available for user selection.

Figure 7:
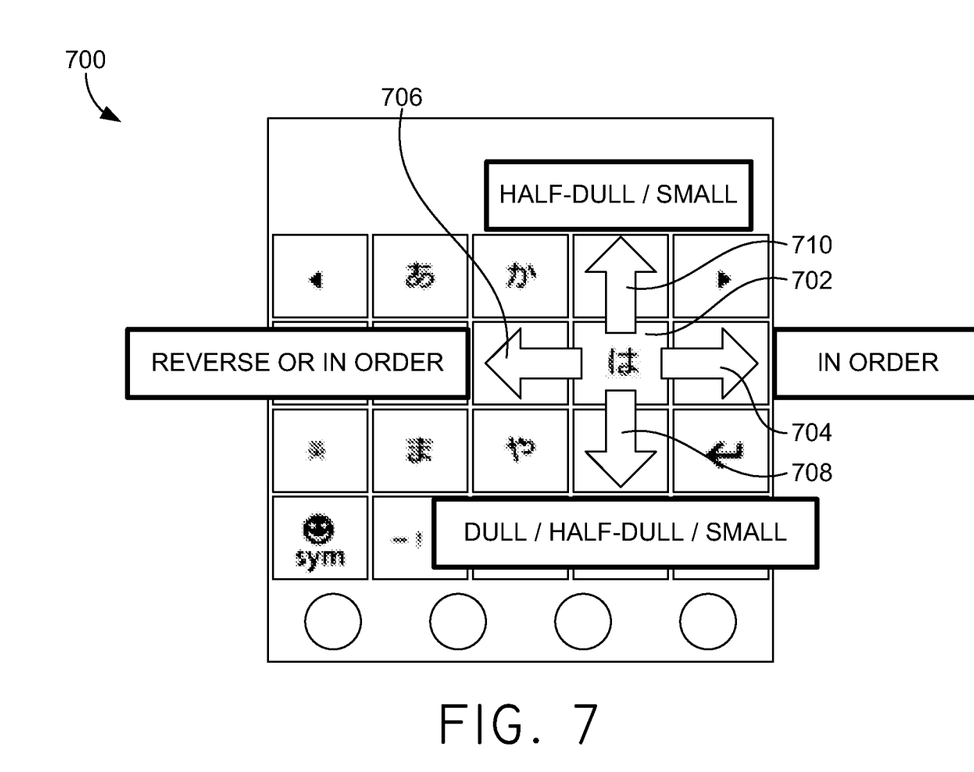
FIG. 7 illustrates exemplary functionality of a sliding user selection of a kana character on a 12-key touchscreen keypad extending either right, left, up, or down.

In some embodiments, the additional kana characters are displayed next to each other such that the entirety of each additional character is visible or are displayed overlappingly such that the last additional character displayed is fully displayed and the characters that were previously displayed are partially displayed. In FIGS. 4A-4H, sliding user selection 404 extends to the right, and additional kana characters 410, 414, 418, and 422 are displayed overlappingly in a line above first kana character 402, the line extending away from first kana character 402. The additional kana characters may also be displayed in a curve or other shape. In some embodiments, the additional kana characters are displayed in a line in the direction of the sliding user selection. In some embodiments, a sliding user selection in different directions will provide different selection choices. For example, sliding to the right, left, up, and down may each provide a different function. This is illustrated in FIG. 7 and discussed below.

Figure 5A:
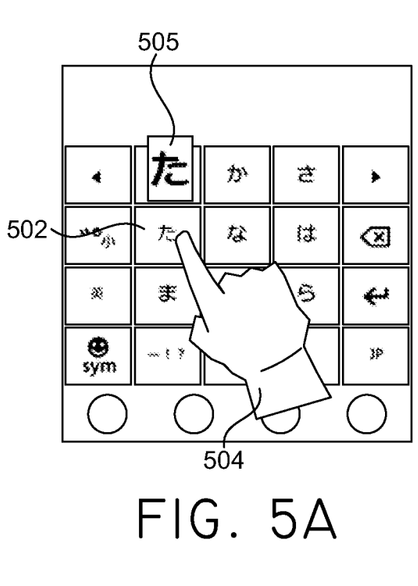
FIG. 5A illustrates the initial selection and resulting display of a first kana character in an exemplary sliding user selection on a touchscreen 12-key keypad.
Figure 5B:
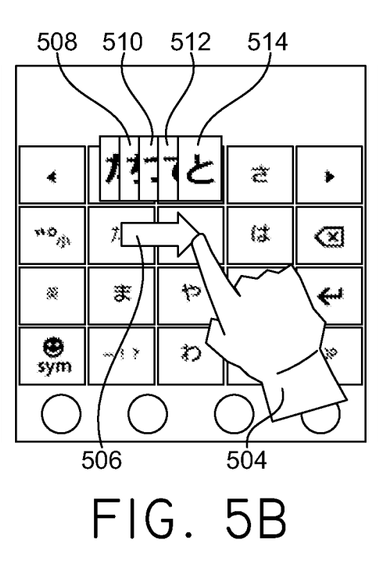
FIG. 5B illustrates the additional kana characters that are displayed as the sliding user selection begun in FIG. 5A extends to the right from the first kana character.

FIGS. 5A-5C illustrate the selection of a modifier. FIG. 5A illustrates the initial selection and resulting display of a first kana character 502 in an exemplary sliding user selection 504. A new, user-selectable soft key 505 displaying first kana character 502 is displayed as a result of the first touch of sliding user selection 504. FIG. 5B illustrates sliding user selection 504 extending to the right away from first kana character 502 as indicated by arrow 506. Similarly to FIGS. 4A-4D, as sliding user selection 504 extended beyond a plurality of threshold points, additional syllabically related kana characters 508, 510, 512, and 514 were displayed. Additional kana characters 508, 510, 512, and 514 are syllabically related because they are all in the "t" column in FIG. 2A. Accordingly, additional syllabically related kana characters 508, 510, 512, and 514 are displayed in the presentation order in FIG. 2A, the presentation order reflecting the accepted kana character teaching method.

Figure 5C:
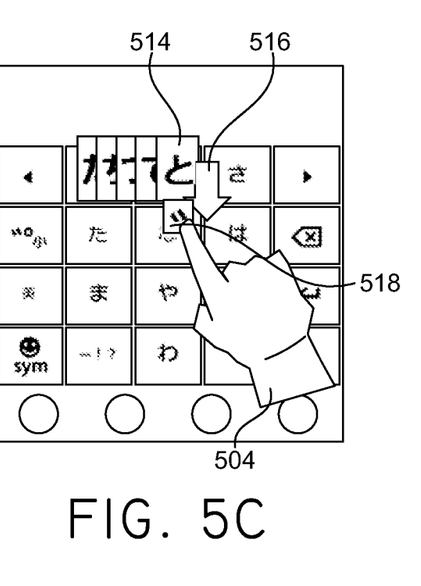
FIG. 5C illustrates a kana character modifier that is displayed when a sliding user selection is made extending down from the last displayed additional kana characters.

In FIG. 5C, a second sliding user selection (or continuation of the first sliding user selection with a change in direction) is received in the downward direction away from the displayed additional characters as indicated by arrow 516. The second sliding user selection causes kana character modifier 518 to be displayed. Selection of modifier 518 results in a selection of the additional character from which the second sliding user selection originated, in this case additional kana character 514, along with selection of modifier 518. The user may release her finger, tap modifier 518, or perform another gesture to select modifier 518. Thus, FIGS. 5A-5C illustrate that in one embodiment, by sliding in two different directions the user can perform two functions. Selecting a first kana character and sliding to the right causes the syllabically related additional kana characters to be displayed, and sliding down, either from the end of the rightward sliding gesture or from one of the additional kana characters, causes one or more modifiers to be displayed for selection.

Figure 6A:
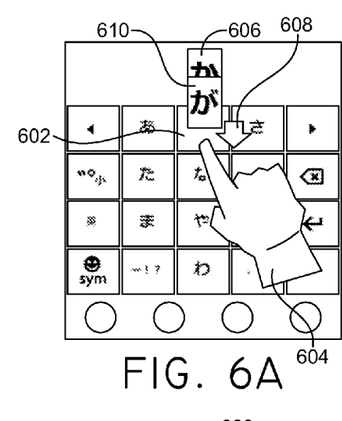
FIG. 6A illustrates an exemplary sliding user selection of a first kana character on a touchscreen 12-key keypad in which a first kana character is initially selected and displayed and the first kana character and a modifier are also displayed as the sliding user selection extends down.

FIGS. 6A-6E illustrate another way of displaying and selecting kana characters together with modifiers. In one embodiment, the functionality shown in FIGS. 6A-6E is implemented together with the functionality shown in FIGS. 4A-4H and FIGS. 5A-5C. In FIG. 6A, a sliding user selection 604 of a first kana character 602 on a touchscreen 12-key keypad is made. In response to the selection, a new soft key 606 displaying first kana character 602 is initially displayed above first kana character 602. As sliding user selection 604 extends down as indicated by arrow 608 and extends beyond a first threshold point (not shown), a new single, user-selectable soft key 610 is displayed that includes both first kana character 602 and a modifier. As sliding user selection 604 continues to extend down in FIG. 6B as indicated by arrow 612, first additional kana character 602 and a modifier are displayed together on a new soft key 614 according to the presentation order.

Figure 6B:
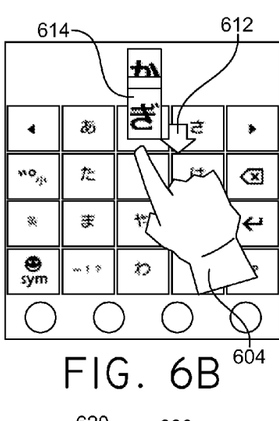
FIG. 6B illustrates the sliding user selection of FIG. 6A as the sliding selection continues to extend down and causes one additional syllabically related kana character and modifier to be displayed.
Figure 6C:
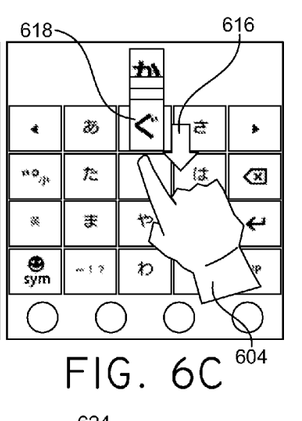
FIG. 6C illustrates the sliding user selection of FIG. 6B as the sliding selection continues to extend down and causes a second additional syllabically related kana character and modifier to be displayed.
Figure 6D:
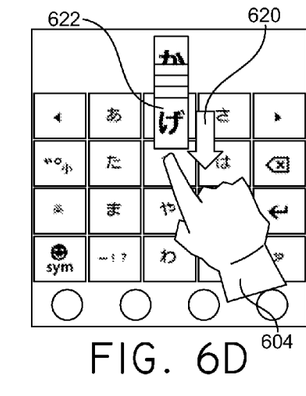
FIG. 6D illustrates the sliding user selection of FIG. 6C as the sliding selection continues to extend down and causes a third additional syllabically related kana character and modifier to be displayed.
Figure 6E:
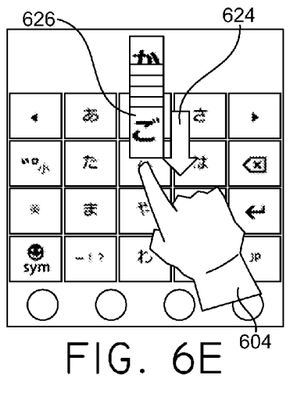
FIG. 6E illustrates the sliding user selection of FIG. 6D as the sliding selection continues to extend down and causes a fourth additional syllabically related kana character and modifier to be displayed.

In FIGS. 6A-6B, the "ka" syllable is selected with the initial touch of sliding user selection 604. When sliding user selection 604 passes the first threshold point, the kana character for the "ka" syllable will be displayed along with a modifier. This character combination is the "go" syllable in FIG. 2B. When sliding user selection 604 extends past the second threshold point, the next syllabically related character and modifier in the presentation order are displayed. Thus, as sliding user selection 604 continues to extend down as indicated by arrows 616, 620, and 624 in FIGS. 6C, 6D, and 6E, the next characters plus modifiers in the "g" column in FIG. 2B are displayed (characters plus modifiers 618, 622, and 626) in the presentation order found in FIG. 2B.

In one embodiment, the functionality of FIGS. 4A-6E is combined. Thus, from an initially selected first kana character, sliding in a first direction (right) causes the additional syllabically related kana characters to be displayed in the presentation order shown in FIG. 2A. If the sliding selection is directed in a perpendicular direction (down) from one of the additional kana characters, a modifier is displayed. Also, from the initially selected first kana character, sliding in the second direction (down) causes the first kana symbol and a modifier to be displayed, and as the sliding selection continues down, additional syllabically related kana characters and modifiers are displayed in the presentation order shown in FIG. 2B.

FIG. 7 illustrates a 12-key touchscreen keypad 700 in which a sliding user selection extending in different directions has different functionality. A first kana character 702 is selected by the initial contact of a sliding user selection. When the selection slides to the right as indicated by arrow 704, additional syllabically related kana characters are presented in the accepted kana character teaching order (presentation order) shown in FIG. 2A. In one embodiment, this occurs as described with regard to FIGS. 4A-4D. When the selection slides down as indicated by arrow 708, the first kana character and additional syllabically related kana characters are displayed in the presentation order along with a modifier (dull, half-dull, or small) as the selection continues to extend. In one embodiment, this occurs as described with regard to FIGS. 6A-6E.

When the selection slides to the left as indicated by arrow 706, additional syllabically related kana characters are presented in either the presentation order or in a reverse presentation order. Similarly to sliding down, when the selection slides up as indicated by arrow 710, the first kana character and additional syllabically related kana characters are displayed in the presentation order along with a modifier as the selection continues to extend. In one embodiment, this occurs as described with regard to FIGS. 6A-6E. It is contemplated that the functionality associated with each sliding direction may in some embodiments be assigned to a different direction than that shown in FIG. 7.

Figure 8:
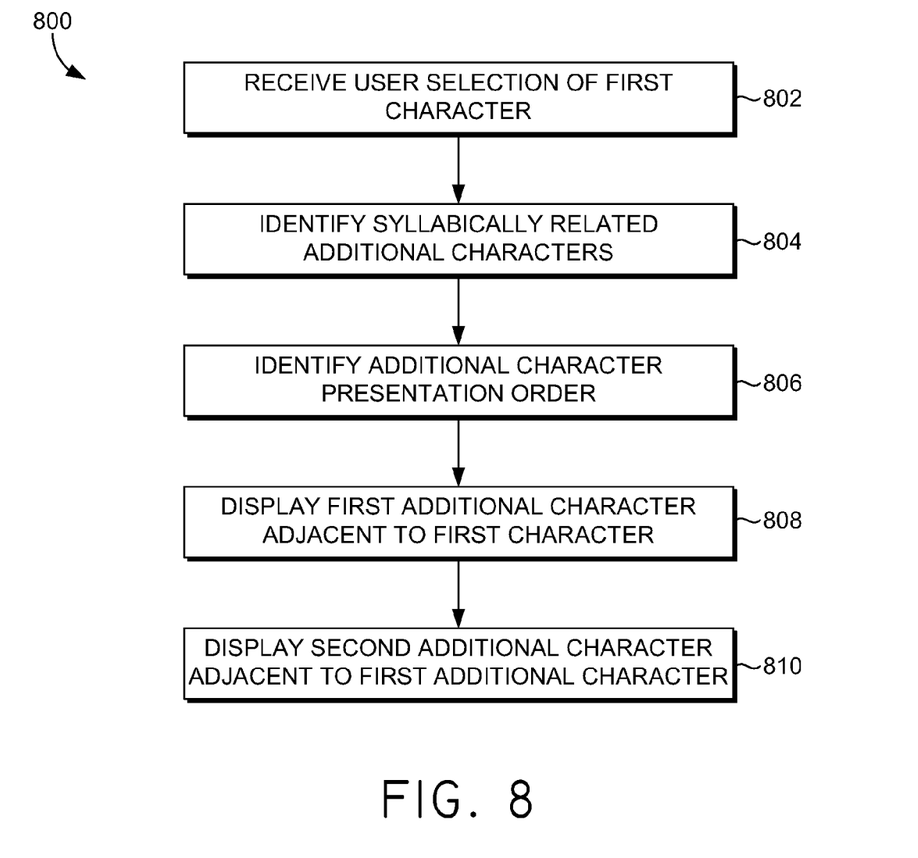
FIG. 8 is a flow chart of an exemplary method for selecting characters through touchscreen input in accordance with an embodiment of the present invention.

FIG. 8 is a flow chart illustrating a method 800 for selecting characters through touchscreen input. In step 802, a user selection of a first character displayed on a touchscreen is received. In step 804, a plurality of additional characters syllabically related to the first character is displayed. A presentation order of the plurality of additional characters is identified in step 806. The presentation order may be an accepted character teaching order. In step 808, in response to receiving the user selection of the first character, a first additional character from the plurality of syllabically related additional characters is displayed. In step 810, in response to receiving the user selection of the first character, a second additional character is displayed adjacent to the first additional character, the displayed first and second additional characters selectable by a user touch input.

In some embodiments, the user selection of the first character received in step 802 is a sliding selection in a first direction away from the displayed first character. The sliding selection extends from the first character, beyond a first threshold point, and beyond a second threshold point. The first additional character is displayed as the sliding selection extends beyond the first threshold point. The second additional character is displayed as the sliding selection extends beyond the second threshold point.

In one particular embodiment in which the user selection is a sliding user selection, while at least one of the first and second additional characters remain displayed, a second sliding user selection in a second direction perpendicular to the first direction is received. The second direction being away from the at least one of the first and second additional characters that remain displayed. In response to receiving the second sliding user selection, one or more syllabic character modifiers selectable by a user touch input are displayed.

Figure 9:
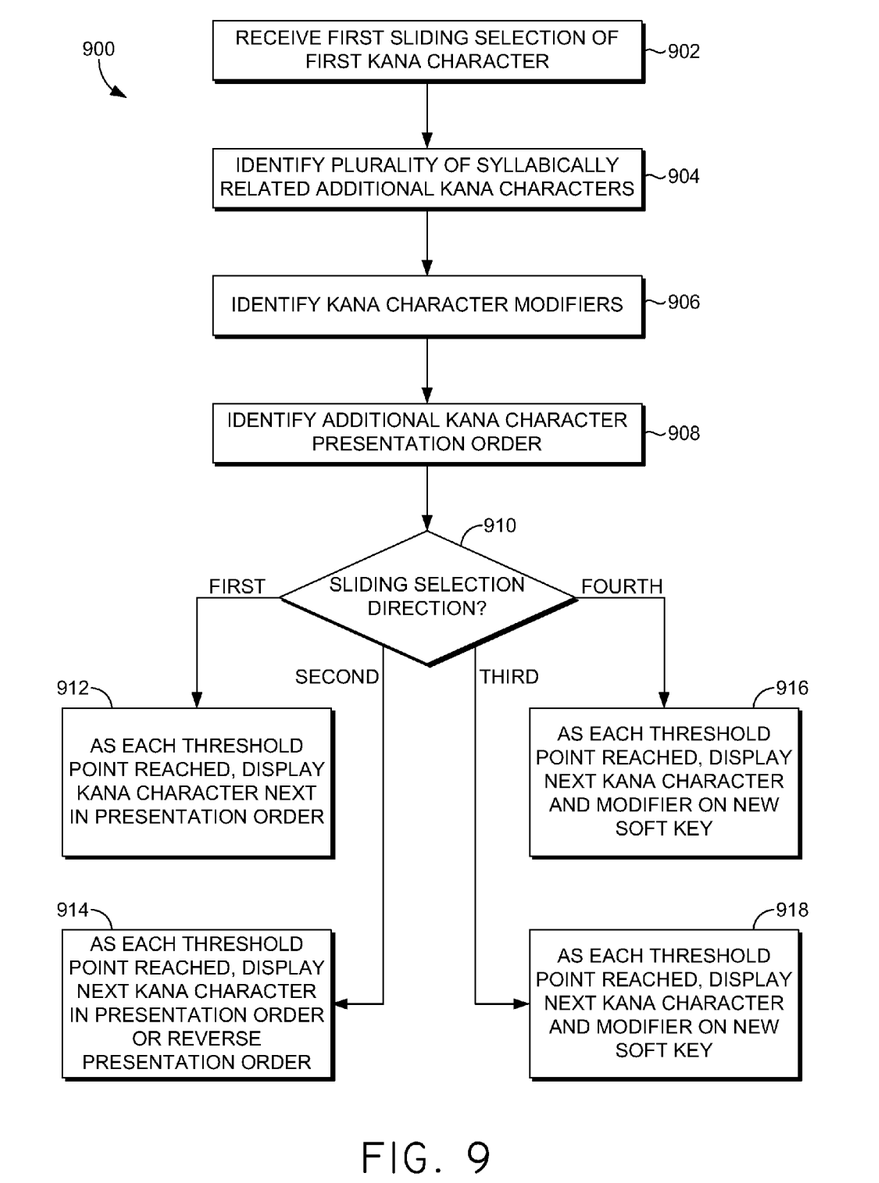
FIG. 9 is a flow chart of an exemplary method for selecting kana characters through touchscreen input in accordance with an embodiment of the present invention.

FIG. 9 illustrates a method 900 for selecting Japanese kana characters through touchscreen input. In step 902, a first sliding user selection of a first kana character displayed on a soft key of a 12-key phone touchscreen keypad is received. The first sliding user selection extends away from the displayed first kana character, beyond a plurality of threshold points, and to an end point. In step 904, a plurality of additional kana characters syllabically related to the first kana character are identified. In step 906, one or more kana character modifiers are identified, the modifiers used with the first kana character and the plurality of additional kana characters. In step 908, a presentation order of the plurality of additional kana characters is identified that reflects a typical kana character teaching order. A sliding selection direction is determined in step 910.

Upon determining that the first sliding user selection extends in a first direction from the displayed first kana character, one of the plurality of syllabically related additional kana characters that is next in the identified presentation order is displayed in step 912 as the first sliding user selection extends beyond each of the plurality of threshold points in the first direction.

Upon determining that the first sliding user selection extends in a second direction from the displayed first kana character, as the first sliding user selection extends beyond a first threshold point in the second direction, both the first kana character and one of the one or more identified kana character modifiers are displayed on a new single, user-selectable soft key in step 914. Also in step 914, as the first sliding user selection extends beyond each of the remaining plurality of threshold points in the second direction, displaying on a new single, user-selectable soft key, both (1) one of the plurality of syllabically related additional kana characters that is next in the identified presentation order and (2) one of the one or more identified kana character modifiers are displayed on a new single, user-selectable soft key. The second direction is different from the first direction.

In step 916, upon determining that the first sliding user selection extends in a third direction from the displayed first kana character, the third direction being substantially opposite from the first direction, one of the plurality of syllabically related additional kana characters is displayed as the first sliding user selection extends beyond each of the plurality of threshold points in the third direction, the displayed kana character being next in one of: the identified presentation order or a reverse identified presentation order.

In step 918, upon determining that the first sliding user selection extends in a fourth direction from the displayed first kana character, the fourth direction being substantially opposite from the second direction, as the first sliding user selection extends beyond each of the plurality of threshold points in the fourth direction, both (1) one of the plurality of syllabically related additional kana characters that is next in the identified presentation order and (2) one of the one or more identified kana character modifiers are displayed on a new single, user-selectable soft key.

Although the examples and figures in this application show Japanese kana characters, embodiments of the present invention can be applied to other syllabic character scripts. This is contemplated by the inventors as within the scope of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:

1. A computer storage device having embodied thereon computer-executable instructions that, when executed by a computing device, cause the computing device to perform a method of selecting characters through touchscreen input, the method comprising:

receiving a user selection of a first character displayed on a touchscreen, wherein the received user selection of the first character is a sliding selection in a first direction away from the displayed first character, the sliding selection extending from the first character, beyond a first threshold point, and beyond a second threshold point;

identifying a plurality of additional characters syllabically related to the first character;

identifying a presentation order of the plurality of additional characters; and in response to receiving the user selection of the first character, displaying at least a first and a second additional character from the plurality of syllabically related additional characters, the first additional character displayed adjacent to the first character and the second additional character displayed adjacent to the first additional character, the displayed first and second additional characters selectable by a user touch input, wherein the first additional character is displayed as the sliding selection extends beyond the first threshold point, and wherein the second additional character is displayed as the sliding selection extends beyond the second threshold point.

2. The computer storage device of claim 1, wherein the characters are Japanese kana characters.

3. The computer storage device of claim 1, wherein the presentation order corresponds to an accepted character teaching order.

4. The computer storage device of claim 1, wherein the first and second additional characters are displayed in a line.

5. The computer storage device of claim 1, wherein the first and second additional characters are displayed in one of the following manners: (1) next to each other such that the entirety of both the first and second additional characters are visible or (2) overlappingly displayed such that the second additional character is fully displayed and the first additional character is partially displayed.

6. The computer storage device of claim 1, further comprising:

receiving a user selection of the displayed first or second additional characters; and in response to receiving the user selection of the displayed first or second additional characters, displaying one or more syllabic character modifiers adjacent to the selected additional character, the displayed one or more syllabic character modifiers selectable by a user touch input.

7. The computer storage device of claim 6, wherein the syllabic character modifier is one of dakuten or handakuten.

8. The computer storage device of claim 1, further comprising:

while at least one of the first and second additional characters remain displayed, receiving a second sliding user selection in a second direction perpendicular to the first direction, the second direction being away from the at least one of the first and second additional characters that remain displayed; and in response to receiving the second sliding user selection, displaying one or more syllabic character modifiers selectable by a user touch input.

9. A mobile device configured to present a user interface for selecting Japanese kana characters via a touchscreen, the mobile device comprising:

a processor;
a memory; and
a display engine that:
receives a user selection of a first kana character displayed on a soft key;
identifies a plurality of additional kana characters syllabically related to the first kana character;
identifies a presentation order of the plurality of additional characters;
in response to receiving the user selection of the first kana character, displays at least a first and a second additional kana character from the plurality of syllabically related additional kana characters, the first additional kana character displayed adjacent to the first kana character and the second additional kana character displayed adjacent to the first additional kana character, the displayed first and second additional kana characters selectable by a user touch input;
receives a user selection of the displayed first or second additional kana characters; and
in response to receiving the user selection of the displayed first or second additional kana characters, displays one or more syllabic character modifiers adjacent to the selected additional kana character, the displayed one or more syllabic kana character modifiers selectable by a user touch input.

10. The mobile device of claim 9, wherein the presentation order corresponds to an accepted character teaching order.

11. The mobile device of claim 9, wherein the first and second additional characters are displayed in a line in one of the following manners: (1) next to each other such that the entirety of both the first and second additional characters are visible or (2) overlappingly displayed such that the second additional character is fully displayed and the first additional character is partially displayed.

12. The mobile device of claim 9, wherein the received user selection of the first kana character is a sliding selection in a first direction away from the displayed first kana character, the sliding selection extending from the first kana character, beyond a first threshold point, and beyond a second threshold point, wherein the first additional kana character is displayed as the sliding selection extends beyond the first threshold point, and wherein the second additional kana character is displayed as the sliding selection extends beyond the second threshold point.

13. A computer storage device having embodied thereon computer-executable instructions that, when executed by a computing device, cause the computing device to perform a method of selecting characters through touchscreen input, the method comprising:

receiving a first sliding user selection of a first kana character displayed on touchscreen keypad, the first sliding user selection extending away from the displayed first kana character, beyond a plurality of threshold points;

identifying:
a plurality of additional kana characters syllabically related to the first kana character,
one or more kana character modifiers that are used with the first kana character and the plurality of additional kana characters, and
a presentation order of the plurality of additional kana characters that reflects a typical kana character teaching order;

upon determining that the first sliding user selection extends in a first direction from the displayed first kana character, displaying one of the plurality of syllabically related additional kana characters that is next in the identified presentation order as the first sliding user selection extends beyond each of the plurality of threshold points in the first direction; and upon determining that the first sliding user selection extends in a second direction from the displayed first kana character, as the first sliding user selection extends beyond a first threshold point in the second direction, displaying both the first kana character and one of the one or more identified kana character modifiers, and, as the first sliding user selection extends beyond each of the remaining plurality of threshold points in the second direction, displaying both (1) one of the plurality of syllabically related additional kana characters that is next in the identified presentation order and (2) one of the one or more identified kana character modifiers, wherein the second direction is different from the first direction.

14. The computer storage device of claim 13, wherein the first direction is one of left or right, and wherein the second direction is one of up or down.

15. The computer storage device of claim 13, further comprising:

upon determining that the first sliding user selection extends in a third direction from the displayed first kana character, the third direction being substantially opposite from the first direction, displaying one of the plurality of syllabically related additional kana characters as the first sliding user selection extends beyond each of the plurality of threshold points in the third direction, the displayed kana character being next in one of: the identified presentation order or a reverse identified presentation order.

16. The computer storage device of claim 13, further comprising:

upon determining that the first sliding user selection extends in a fourth direction from the displayed first kana character, the fourth direction being substantially opposite from the second direction, as the first sliding user selection extends beyond each of the plurality of threshold points in the fourth direction, displaying on a new single, user-selectable soft key, both (1) one of the plurality of syllabically related additional kana characters that is next in the identified presentation order and (2) one of the one or more identified kana character modifiers.

17. The computer storage device of claim 13, further comprising:

after determining that the first sliding user selection extends in the first direction from the displayed first kana character and while at least one of the additional kana characters displayed as a result of the first sliding user selection remain displayed, receiving a second sliding user selection perpendicular to the first direction, the second sliding user selection beginning at one of the displayed additional kana characters; and in response to receiving the second sliding user selection, displaying at least one of the one or more syllabic character modifiers, wherein selection of one of the at least one displayed syllabic character modifiers results in selection of the displayed additional kana character from which the second sliding user selection began as well as the selected displayed syllabic character modifier.

18. The computer storage device of claim 13, wherein each displayed syllabically related additional kana character remains displayed while the first sliding user selection is being made and is displayed in the presentation order such that when the first sliding user selection extends to the end point, the plurality of additional kana characters is displayed in a line in the presentation order, the line extending from first in the presentation order to last in the presentation order in the same direction as the first sliding user selection, and wherein the plurality of additional characters are displayed in one of the following manners: (1) next to each other such that the entirety of each additional character is visible or (2) overlappingly displayed such that the last additional character displayed is fully displayed and the additional characters displayed prior to the last additional character are partially displayed.

* * * * *